United States Patent [19]

Baldwin

[11] 4,293,857
[45] Oct. 6, 1981

[54] COLLISION AVOIDANCE WARNING SYSTEM

[76] Inventor: Edwin L. Baldwin, Oakwood Garden Apts. So., Apt. Z-204 & 60 Saratoga Ave., San Jose, Calif. 95129

[21] Appl. No.: 65,749

[22] Filed: Aug. 10, 1979

[51] Int. Cl.³ .............................................. G01S 13/74
[52] U.S. Cl. ................................................ 343/6.5 R
[58] Field of Search ....................... 343/6.5 LC, 6.5 R

[56] References Cited

U.S. PATENT DOCUMENTS

| | | | |
|---|---|---|---|
| 2,746,034 | 5/1956 | Hasbrook | 343/15 |
| 2,837,738 | 6/1958 | Van Valkenburgh | 343/112 CA X |
| 2,842,764 | 7/1958 | Harvey | 343/112 CA X |
| 2,933,726 | 4/1960 | Campbell et al. | 343/112 CA |
| 2,969,539 | 1/1961 | Miner | 343/112 CA |
| 3,025,514 | 3/1962 | Alexander et al. | 343/112 CA X |
| 3,250,896 | 5/1966 | Perkinson et al. | 343/7.5 |
| 3,310,806 | 3/1967 | Stansbury | 343/112 CA |
| 3,469,079 | 9/1969 | Stansbury | 343/112 CA X |
| 3,544,995 | 12/1970 | Bottenberg et al. | 343/15 X |
| 3,808,598 | 4/1974 | Carter | 343/112 CA |
| 3,895,382 | 7/1975 | Litchford | 343/6.5 LC |
| 3,959,793 | 5/1976 | Litchford | 343/6.5 LC X |
| 4,021,802 | 5/1977 | Litchford | 343/6.5 LC |
| 4,070,671 | 1/1978 | Morrow | 343/6.5 LC |

Primary Examiner—Malcolm F. Hubler
Attorney, Agent, or Firm—Browdy and Neimark

[57] ABSTRACT

An aircraft collision-avoidance system utilizing a known-location navigational ground station to enable a primary aircraft to determine its own location and employing a known-location air surveillance radar including an interrogator to determine the location, velocity, course and altitude of a potentially conflicting other aircraft. The technique utilizes the time between the inception of an interrogating pulse and the reception of a transponder response from the target aircraft to compute the position and altitude of said target aircraft, and employs storage of repeated timed samplings of the data and subsequent replacement of the data as a series of dots on a display to establish a line showing the relative motion of the target aircraft with respect to the primary aircraft. An alarm device is provided to direct aircrew attention to potential conflicts predicted by a data processor carried by the primary aircraft and forming part of the system.

13 Claims, 2 Drawing Figures

COLLISION AVOIDANCE WARNING SYSTEM

FIELD OF THE INVENTION

This invention relates to aircraft collision avoidance systems, and more particularly to a method and means to determine and display to the crew of an inflight aircraft the location, course, speed and altitude of other aircraft operating in the vicinity, and to compute and display the predicted paths of aircraft in the vicinity so as to identify and warn against potential collision conditions.

BACKGROUND OF THE INVENTION

Previously proposed aircraft collision avoidance systems suffer from many serious disadvantages, mainly because they require the use of a large amount of expensive and cumbersome special equipment and do not take adequate advantage of the standard ground-based navigational equipment now in widespread use and at known locations. Such standard ground-based equipment includes existing navigational aids, known as "very-high-frequency omnidirectional range-distance measuring equipment" (VOR-DME) or comparable ground-based aids to navigation. The locations of these VOR-DME facilities are known, and they are commonly used, employing suitable conventional utilization apparatus on the aircraft.

Also, air route surveillance and air traffic control radars operate throughout the United States. The locations of these radars are accurately known, as are their mechanical and electronic characteristics. These radars are equipped with what is known as a "secondary radar" which operates in synchronization with the primary radar and functions as an interrogator to airborne transponders. The purpose of the interrogator/transponder system is to provide a capability to track aircraft at ranges, under conditions, and to an accuracy which would otherwise be impractical, if not impossible. The interrogator will trigger airborne transponders anywhere within radar line of sight of the interrogating radar. The responses from interrogated aircraft can be detected and accurately displayed at air traffic controller positions even when range, meteorological conditions, traffic density, or electrical interference degrade the performance of the primary, or skintrack radar.

Airborne transponders are carried by all airline and military aircraft, and by nearly all commercial aircraft. Transponders are also carried by a high (and growing) percentage of private aircraft. Use of these transponders is mandatory in many flight conditions and in certain designated high traffic-density areas (Terminal Control Areas, or TCA). The transponder provides primarily a recognizable target to the interrogating radar. In addition, certain transponders provide the altitude data of the transponding aircraft, and other information.

There is a substantial need for a system which utilizes these existing facilities for aircraft collision avoidance, without requiring the use of an excessive amount of additional equipment.

The following prior U.S. patents were found in a preliminary search and are believed to be of interest in showing the present general state of the art:

Van Valkenburgh, U.S. Pat. No. 2,837,738
Harvey, U.S. Pat. No. 2,842,764
Campbell et al, U.S. Pat. No. 2,933,726
Miner, U.S. Pat. No. 2,969,539
Alexander et al, U.S. Pat. No. 3,025,514
Perkinson et al, U.S. Pat. No. 3,250,896
Stansbury, U.S. Pat. No. 3,310,806
Stansbury, U.S. Pat. No. 3,469,079
Carter, U.S. Pat. No. 3,808,598

SUMMARY OF THE INVENTION

The present invention pertains to a method and means to determine and display, to the crew of an inflight aircraft, the location, course, speed and altitude of other aircraft operating in the vicinity of the primary first-named aircraft. The method also provides for computation of predicted paths of aircraft in the vicinity based upon present position, course, speed and altitude, and to identify potential collision conditions several minutes before a collision could occur. The principal advantages of the technique of the present invention, as compared to other methods, are its relatively low cost, the fact that no additional radar, beacon, or communication signals are required, and its compatibility with existing and planned aids to aircraft navigation and air traffic control.

There are three levels of utility appropriate to this technique. They range from primary warning of a potential collision or collision hazard, through other aircraft identification, to the provision of a secondary aid to air traffic control.

In the primary warning role, this technique would alert the aircraft crew to a potential collision situation at least two minutes before a collision would occur. This warning would provide time to maneuver to avoid the hazardous condition without violent maneuvers that might result in endangering still other aircraft or in injury or discomfort to passengers on the maneuvering aircraft. There would also be time to coordinate these maneuvers with air traffic controllers, a mandatory requirement toward maintaining an orderly and safe flow of air traffic.

In the aircraft identification role this technique would supplement traffic advisories given by air traffic controllers. When a controller identifies other aircraft (targets) to the aircrew by approximate range and bearing, the aircrew could readily confirm the target's location, and then assess the possibility of conflict even without actually seeing the target, for example, under conditions of darkness, haze, background, or bright sunlight often making the sighting of a target aircraft difficult even under visual flight rules conditions. This is especially true of high performance aircraft with rather limited direct fields of view.

The third role, as a secondary aid to air traffic control, would lead to expediting aircraft movements through congested airspace, particularly when approaching or departing from major air terminals. In this application the primary aircraft could simply be instructed to follow a given target aircraft while maintaining a specific distance between them. This procedure would reduce the need for controller-pilot communications, which would reduce the workload on both pilots and controllers while freeing communications channels for other needs; these are both important factors in improved air safety.

The practicability of the method of the present invention is derived from the ability to locate an aircraft with respect to an air traffic control radar and then to locate other aircraft in the vicinity with respect to that same radar and hence to the first aircraft. This is accomplished by first locating the primary aircraft with respect to bearing angle and distance from one or more standard existing navigational aids, known as a "very-high-frequency omnidirectional range-distance measuring equipment" (VOR-DME). The location of these ground-based VOR-DME facilities is known, and they are commonly used. The second step is to identify an air surveillance radar (ASR) that is operating and interrogating the primary aircraft. The location, rotation rate, radio frequency (RF), and pulse repetition frequency (PRF), of this ground-based ASR are known, or are readily measurable as is the frequency of its secondary radar (called an "interrogator"). The parameters of each ASR system can easily be stored (and updated as necessary) in a very small memory unit carried on the primary aircraft. Primary frequency signals from the ASR are needed for positive identification of the radar and for synchronization of other aircraft responses in a PRF correlation technique. That is, only those responses that are in time and PRF correlation with the ASR of interest will be accepted as valid returns. This correlation is necessary because airborne transponders often are being interrogated by more than one ASR, with the result that non-correlated responses would create spurious false targets that would mask valid targets and confuse the cockpit display, seriously degrading the utility of this technique. A further need for correlation is to measure the time between the interrogation of a target and its response, making it possible to determine the distance from the ASR to the target aircraft. Accurate PRF tracking is obtained by detecting side-lobe energy from the ASR primary radar even when the ASR antenna is not directed at the primary aircraft.

Data acquired through the technique described above can now be presented to the crew of the primary aircraft in a visual display showing the location of other aircraft in the vicinity with respect to the primary aircraft.

The relative velocity and changes in direction of these other aircraft can also be shown on the same display, using existing moving target display techniques. For illustrative purposes it is most useful to consider a store-and-flashback technique. In this case, data acquired through several rotations of the ASR are stored, the display is swept clean for a narrow segment preceding the presentation of new data, namely, that acquired most recently, and then data from a number of rotations is presented quickly in rapid succession. By storing two minutes of data, approximately twelve data points can be retained for each target. Replacing this data as a series of dots on the display in a period of less than one second, beginning with the oldest (twelfth) and ending with the newest (first) the series of dots forms a line showing relative motion of the target with respect to the primary aircraft. This relative motion is a most significant indication of the possibility of a midair collision.

There are other means of displaying moving targets that could be applied in this case. Among them are forming lines, as discussed above, and putting arrowheads on the display in the direction of relative motion. Another expedient is using a dimout technique where the most recent data indicating present location is shown at a high intensity level and then is permitted to fade slowly. To obtain results similar to the flashback technique the dimout period (from brightest to disappearance) would be about two minutes. The choice of display technique is not critical to the present invention but should depend upon the ease with which the display can be used and interpreted by the aircrew.

A growing number of airborne transponders carry meaningful information while providing clear and distinct targets to the ASR system. The most important information, from a collision avoidance viewpoint, is the altitude, since aircraft at substantially different altitudes pose no threat of collision to each other. In congested airspace near major terminals, essentially all aircraft are required to have and use altitude encoding transponders (those transmitting altitude). The data processor employed herein is designed to decode this altitude information and cause it to be displayed with the associated targets. Altitude separation can also be considered (when known) by the processor in identifying conflicts and driving the alarm system so that false alarms need not be generated when ample clearance exists.

An aircrew is required to perform and monitor many functions and systems, ranging from aircraft control, navigation, communication, engine performance and passenger comfort systems. Hence it is not reasonable to expect the aircrew to observe the collision avoidance display continuously. The system of the present invention includes an aural alarm, which must be uniquely different from but compatible with similar alarms for functions such as terrain avoidance, pressurization, and engine system warnings. A bell, buzzer, or suitable warbling tone-generator consistent with the unique and compatible requirements may be provided to direct aircrew attention to conflicts predicted by the data processor.

Accordingly, a main object of the present invention is to provide an improved aircraft collision-avoidance system which overcomes the deficiencies and disadvantages of the previously used or proposed aircraft collision-avoidance systems.

A further object of the invention is to provide an improved aircraft collision-avoidance system which mainly utilizes currently available known ground-based navigational and air traffic control equipment for detecting and determining the location and motional characteristics of a potentially conflicting aircraft from a primary aircraft.

A still further object of the invention is to provide an improved aircraft collision-avoidance system wherein a primary aircraft can obtain warning data regarding a potentially conflicting other aircraft by obtaining such data directly from standard ground-based aircraft navigational and traffic control equipment, such data being usable to determine the location, velocity and altitude of the conflicting other aircraft and to provide visual and aural warning indications of a potential collision.

A still further object of the invention is to provide an improved method of aircraft collision avoidance utilizing data obtained by a primary aircraft from ground-based VOR-DME and ASR navigational and air traffic control equipment to detect and track a potentially conflicting other aircraft, the method being reliable in action and requiring a relatively modest amount of additional equipment for practical implementation.

A still further object of the invention is to provide a novel and improved aircraft collision-avoidance technique wherein a primary aircraft utilizes standard ground-based navigational equipment, including standard ground radar equipment, to detect and track another, potentially conflicting, target aircraft, utilizing the transponder responses of the target aircraft for establishing its instantaneous location and its subsequent speed, direction and altitude, as well as to provide a visible indication and an aural alarm when there appears to be a possibility of collision.

A still further object of the invention is to provide an improved aircraft collision-avoidance system for a moving primary aircraft to detect and track a potentially conflicting moving other aircraft, utilizing the transponder responses triggered by interrogation signals from a standard ground-based radar of the ASR type, the transponder response signals being processed in the primary aircraft along with other data to give a visual display of the position of the other aircraft so as to track its course and compare it with that of said primary aircraft, and to thereby indicate the possibility of collision between the two aircraft.

A still further object of the invention is to provide an improved aircraft collision-avoidance system which utilizes and is compatible with existing aircraft navigational aids and air traffic controlling equipment and which does not require the use of any additional radar, beacon or communication signal equipment, the system enabling the computation of predicted paths of other aircraft in the vicinity of a primary aircraft, based on present position, course, speed and altitude, and providing identification and warning of potential collision conditions several minutes before a collision could occur.

BRIEF DESCRIPTION OF THE DRAWINGS

Further objects and advantages of the invention will become apparent from the following description and claims, and from the accompanying drawings, wherein:

DESCRIPTION OF A PREFERRED EMBODIMENT

Figure 1:
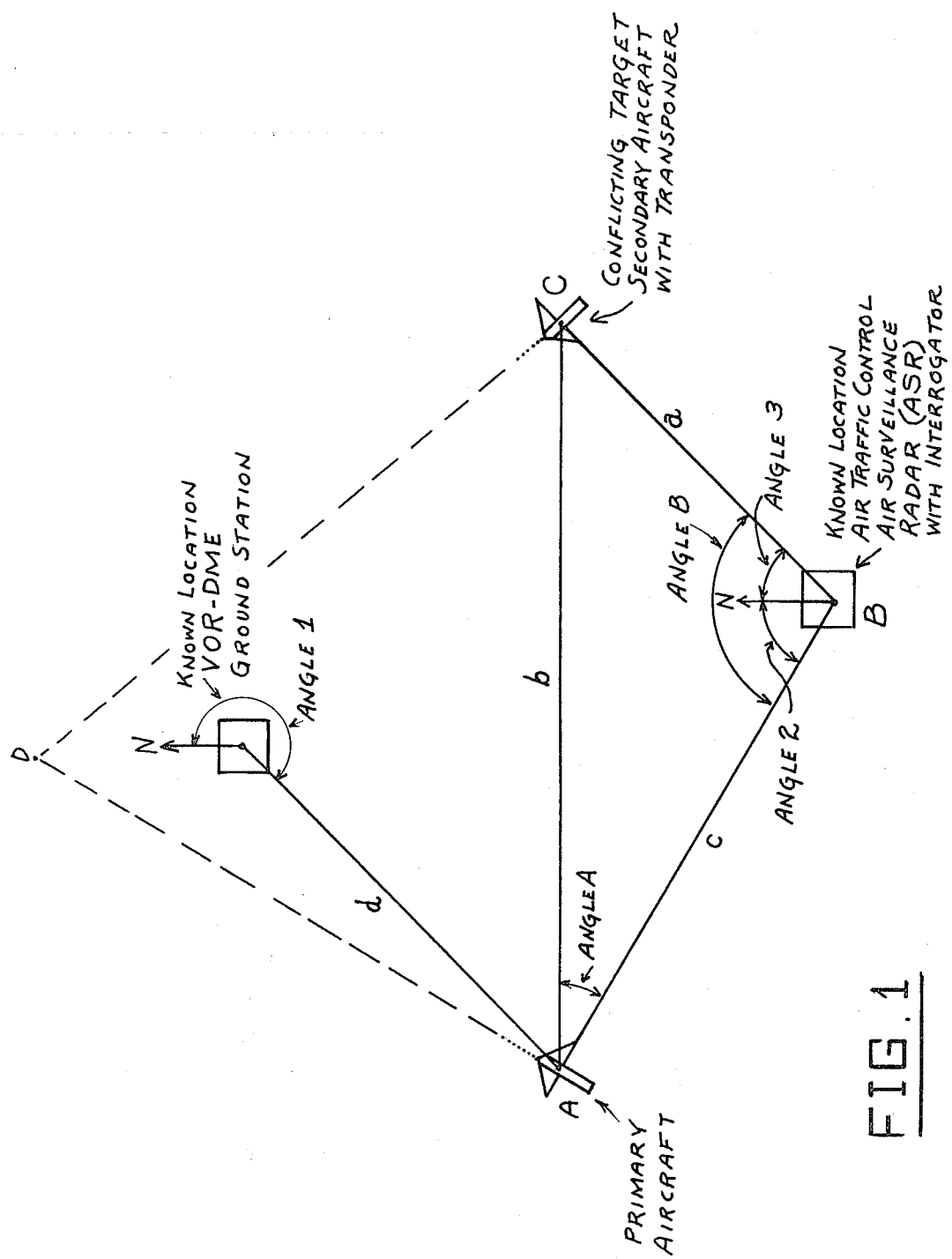
FIG. 1 is a diagram showing the relative positions of a primary aircraft and a potentially conflicting other aircraft with respect to standard ground-based navigational and radar equipment for illustrating the collision-avoidance technique of the present invention.

Referring to the drawings, and more particularly to FIG. 1, a typical example is shown wherein A represents the location of the primary aircraft. The location of the position A can be readily computed from the known location of the nearest VOR-DME ground station, in terms of the bearing Angle 1 and the range distance d.

B represents the known location of a conventional air traffic control surveillance radar (ASR) of the type above mentioned, namely, including interrogation means.

C represents the location of another aircraft (target) which is to be determined.

Angle 2 represents the bearing of A from B, which can be readily computed, since locations A and B are both known.

The range distance c from B to A can be readily found, since both locations A and B are known, as in the location of the VOR-DME ground station.

Angle B represents the measure of the angle formed by ABC, which is obtained from the interval between receipt at A of the interrogation signal from the radar at B and the receipt at A of the transponder signal from the transponder of the aircraft at C, taking into account the known rotational rate of the radar.

The distance BC plus the distance CA is represented by a+b. It is determined also by measuring the difference between the time when the radar interrogation pulse is transmitted (from B to A) and the time that the transponder pulse from C is received at A. This time difference also includes the fixed known transponder time delay, which must be subtracted. The time of transmission of the interrogation pulse from B in the direction of C is determined precisely, from the interrogator's correlation with the primary radar pulse (which can be detected through side-lobe energy at A) and from the pulse repetition frequency tracking of the radar at B, taken together with the known range distance c.

The range distance from A to C is represented by b, which is determined from $b = x - a$, where $x = a + b$, and $a = (x^2 - c^2)/[2x - 2c (\cos B)]$ or equivalent trigonometric identities.

By successively relating the course of the primary aircraft at A to the triangle ABC, the location, course and speed of the target aircraft at C with respect to the primary aircraft at A can be computed in a data processor 11 carried by the primary aircraft.

The above explanation does not consider the corrections required for altitude. When target aircraft altitude data is available, this correction can be readily accomplished in the processor 11 in a three-dimensional solution rather than by the two dimensional illustrative solution above given. When target aircraft altitude data is not available the result is accurate only in terms of slant range related back to the radar. The resulting error is insignificant for collision avoidance and warning but could lead to undesirable false alarms being generated when ample altitude separation exists. This condition is ameliorated because high altitude (and hence high speed) aircraft and those operating near major terminals are required to use altitude encoding equipment. Hence, any transponder that does not provide altitude data will be operating at lower altitudes (below 18,000 feet) where altitude corrections are less significant and will be a threat only to other low altitude aircraft. This means that high altitude aircraft need not suffer false alarms from target aircraft lacking encoding altimeters, while aircraft at lower altitudes will be able to locate these targets with ample precision for collision avoidance.

Figure 2:
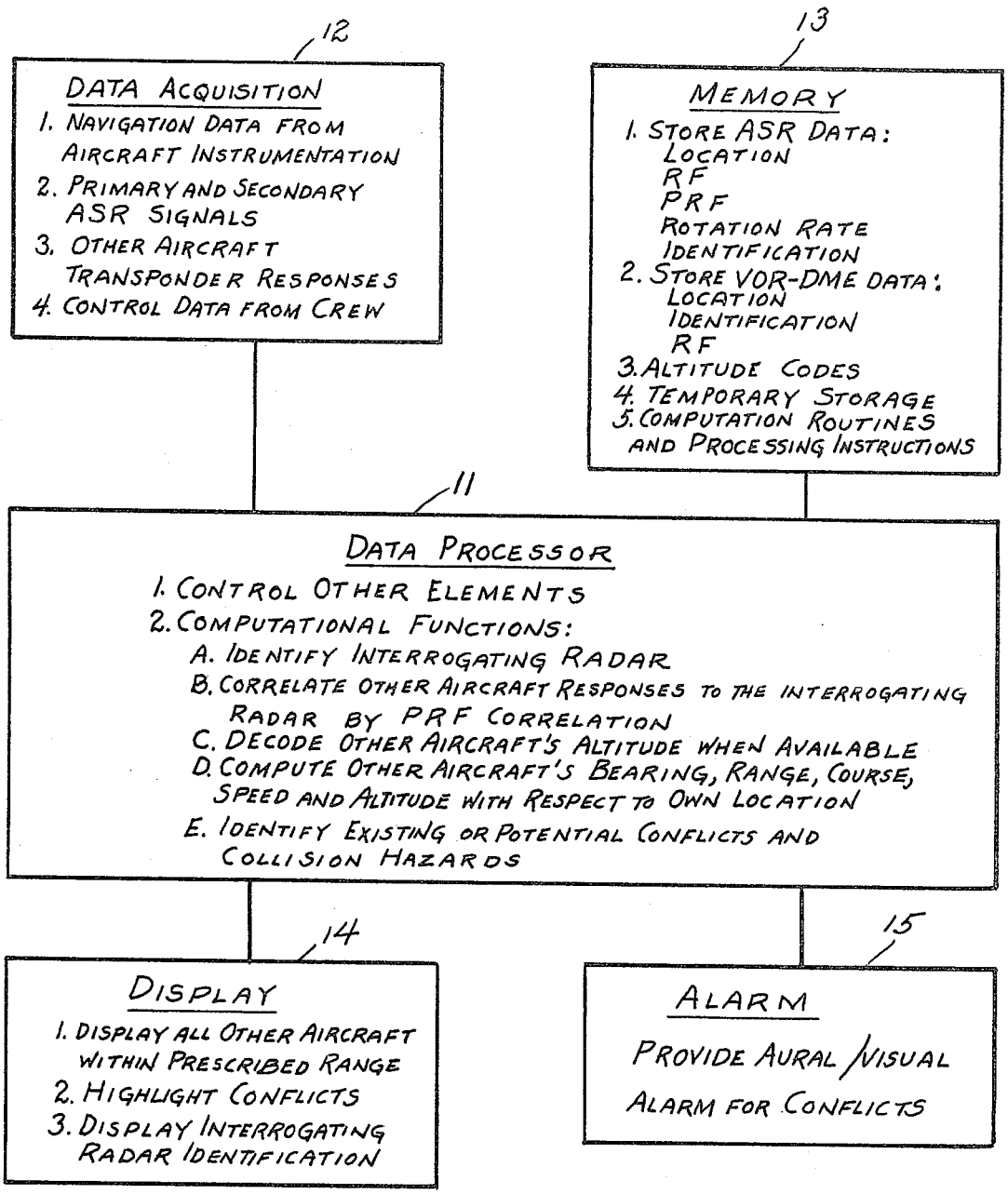
FIG. 2 is a block diagram of the various components on a primary aircraft for acquiring, storing, processing and indicating data for collision avoidance by the technique of the present invention.

Referring now to FIG. 2, showing in block form the various components of the system carried by the primary aircraft, it will be seen that there are five major components required to implement the above-described aircraft collision-avoidance technique. These components comprise a data acquisition unit 12, a memory unit 13, a data processing unit 11, a display unit 14 and a warning unit 15, whose functions are respectively tabulated in said FIG. 2. These functions are respectively described, as follows:

Data Acquisition

1. Navigational data can be obtained directly from the aircraft navigational equipment. Certain data, e.g., rate of climb/descent or heading may require conversion from analog to digital form by the data acquisition unit 12. Navigational data includes location, velocity and altitude. This data can be obtained from the VOR-DME ground station, inertial navigation equipment, compass, directional gyro equipment, air speed and/or ground speed indicator, altimeter, rate of climb indicator, and other related conventional aircraft equipment.

2. Primary and secondary ASR signals can be received via airborne receiving equipment. The secondary radar signal can be obtained from existing airborne transponder receivers. An additional receiver, using an existing aircraft antenna, is required to obtain the ASR primary signal.

3. The transponder responses of other aircraft in the vicinity can be obtained through a second transponder receiver channel, via the existing aircraft transponder antenna.

4. Control functions (such as on/off, display scale changes, or display intensity) may be entered through the data acquisition unit 12 by crew member operation of control switches.

Memory

The memory unit 13 is a data storage device common to solid state electronic data processing systems. It will retain, for access by the data processor 11, data needed for computations and for driving the display. Stored information preprogrammed into the memory unit 13 will include:

1. The location, radio frequency, rotation rate, and electromagnetic identification features of the air surveillance radar systems used by air traffic control.

2. The location, radio frequency, and identifying characteristics of ground based VOR-DME stations used for air navigation.

3. Altitude codes used by airborne encoding altimeters (which are transmitted through the airborne transponder systems).

4. Temporary storage of a history of data displayed through the display unit 14. This temporary data will be retained for approximately two minutes, the most recently acquired data displacing the oldest data. The temporary data will be that displayed to the aircrew and will be used by the data processor for predicting potential collision conflicts.

5. Data processing instructions and computational routines.

Data Processor

1. The data processor 11 will control and drive the other elements and perform required computations. Control functions will include input and recall of data, processing instructions, and computational routines to and from the memory unit 13; driving the display unit 14; and driving the alarm unit 15.

2. Computational functions will include identifying the interrogating radar; correlating other aircraft responses to the interrogating radar by PRF correlation; decoding other aircraft altitudes when available; computing bearing, range, course, speed, and altitude of other aircraft with respect to its own location; and identifying existing or potential conflicts and collision hazards.

Display Unit

1. The display unit 14 will show all targets within the prescribed limits of range. At high altitudes the display unit should be used at a scale showing all targets within at least 20 nautical miles. At lower altitudes where speeds are reduced and traffic congestion is higher, the desired range will be less, probably 10 nautical miles.

2. The display will highlight existing or potential conflicts by continuous flashing of the hazardous target track. When altitude data is available it will be displayed numerically in association with the appropriate target track.

3. The display unit will show the identification of the interrogating radar.

Alarm Unit

The alarm system 15 will provide a bell, buzzer, or warbling tone uniquely different from but compatible with other similar aircraft system alarms, to direct aircrew attention to existing or predicted midair collision conflicts. The potentially dangerous target will simultaneously be highlighted on the visual display.

Again referring to FIG. 1, the heading and speed of the primary aircraft at A are known from the step of employing the VOR-DME in the manner above described and from the instrumentation on the primary aircraft. The heading and speed of the target aircraft at C can be computed by taking several consecutive observations, for example, for several rotations of the ASR, presented quickly in rapid succession and storing for two minutes of data, as above described, replacing the data as a series of dots on the display, etc. The display may be used to predict extrapolated traces leading to a possible point of collision D, as shown in FIG. 1. With the respective speeds and headings of the two aircraft known, the respective times required for them to reach the extrapolated collision point D can be readily calculated by data processor 11. If the calculated travel times to point D of the two aircraft are approximately equal, a potential collision condition is present, and alarm 15 will be triggered by the data processor 11.

While a specific embodiment of an improved aircraft collision avoidance system has been disclosed in the foregoing description, it will be understood that various modifications within the scope of the invention may occur to those skilled in the art. Therefore its is intended that adaptations and modifications should and are intended to be comprehended within the meaning and range of equivalents of the disclosed embodiment.

I claim:

1. A method of detecting a potential collision between a primary aircraft and a secondary aircraft flying in an area containing a known-location standard very-high-frequency omni-directional range-distance measuring ground station (or equivalent) and a known-location air surveillance radar of the rotating antenna type provided with an interrogator, the steps of:

(1) determining on the primary aircraft the bearing angle and distance from said omnidirectional range-distance measuring ground station, whereby to establish the position of the primary aircraft, (2) calculating the radar range distance c between the radar and the primary aircraft, based on the known positions of the primary aircraft, the radar and the ground station, (3) receiving an interrogation pulse at the primary aircraft from the radar, (4) receiving at the primary aircraft the resultant transponder response signal from the secondary aircraft, (5) measuring the time difference between receipt of said interrogator pulse and said transponder response signal at the primary aircraft, (6) calculating the angle B between the bearing vector from the radar to the primary aircraft and the bearing vector from the radar to the secondary aircraft in accordance with said time difference as related to the known rotational period of the radar antenna, (7) receiving at the primary aircraft the side lobe energy of each primary radar pulse from the radar, (8) calculating the value x, which is the sum of the radar range distance between the radar and the secondary aircraft and the distance between the two aircraft, in accordance with the time difference at the primary aircraft between receipt at the primary aircraft of the side lobe energy of the primary radar pulse synchronous with the interrogation to which the secondary aircraft responds and receipt at the primary aircraft of the transponder response signal from the secondary aircraft, (9) calculating the distance from the secondary aircraft to the primary aircraft based on the known or previously calculated values of x, c and angle B, and

(10) calculating the bearing angle from the secondary aircraft to the primary aircraft based on the known angle B, the known bearing angle from the radar to the primary aircraft and the previously calculated distances between the primary aircraft, the secondary aircraft and the radar, whereby to establish the positional data of the secondary aircraft with respect to the primary aircraft.

2. The method of claim 1, and wherein the transponder response signal includes encoded altitude data of the secondary aircraft.

3. The method of claim 1, and further including the steps of repeatedly acquiring the positional data to establish the location of said secondary aircraft for a plurality of successive rotations of the radar antenna, and determining therefrom the course and speed of the secondary aircraft with respect to the primary aircraft.

4. The method of claim 3, and further including the step of generating an alarm signal when the respective courses and speeds of the primary and secondary aircraft indicate a potential collision between the primary and the secondary aircraft.

5. The method of claim 3, and further including the step of temporarily storing the acquired positional data, and, after a predetermined period of storing, displaying the stored data as a series of dots on a display screen to form a line showing the relative motion of the secondary aircraft with respect to the primary aircraft.

6. The method of claim 5, wherein said predetermined period of storing is approximately two minutes.

7. The method of claim 5, wherein approximately twelve data points are retained in storage during said predetermined period of storing.

8. The method of claim 5, wherein the series of dots are displayed on said screen in a period of less than one second, beginning with the oldest and ending with the newest of the series of dots.

9. The method of claim 5, further including the step of generating an alarm on the primary aircraft at least two minutes before the relative motion line of the secondary aircraft predicts a potential collision thereof with the primary aircraft.

10. The method of claim 1, wherein said step (8) further includes substracting the secondary aircraft transponder time delay from said time difference.

11. Apparatus in accordance with claim 10, further including display means for displaying the positional data determined by said calculating means as a series of dots on a display screen to form a line showing the relative motion of the secondary aircraft with respect to the primary aircraft.

12. An apparatus in accordance with claim 11, further including alarm means for generating an alarm on the primary aircraft at least two minutes before the relative motion line of the secondary aircraft predicts a potential collision thereof with the primary aircraft.

13. An apparatus for detecting a potential collision between a primary aircraft and a secondary aircraft flying in an area containing a known-location standard very-high frequency omnidirectional range-distance measuring ground station (or the equivalent) and a known location air surveillance radar of the rotating antenna type provided with an interrogator, comprising, for use on said primary aircraft:

determining means for determining the bearing angle and distance from the omnidirectional range-distance measuring ground station;

receiving means for receiving an interrogation pulse from the radar;

second receiving means for receiving the resultant transponder response signal from the secondary aircraft;

third receiving means for receiving the side lobe energy of each primary radar pulse from the radar;

measuring means for measuring a first time difference between receipt at the primary aircraft of the interrogator pulse directed toward the primary aircraft and the transponder response signal from the secondary aircraft and for measuring a second time difference between receipt at the primary aircraft of the side lobe energy of the primary radar pulse synchronous with the interrogator pulse to which the secondary aircraft responds and the transponder response signal from the secondary aircraft; and calculating means for calculating the radar range distance c between the radar and the primary aircraft based on the known positions of the primary aircraft, the radar and the ground station; calculating the angle B between the bearing vector from the radar to the primary aircraft and the bearing vector from the radar to the secondary aircraft in accordance with said first time difference as related to the known rotational period of the radar antenna; calculating the value x which is the sum of the radar range distance between the radar and the secondary aircraft and the distance between the two aircrafts, based on said second time difference; calculating the distance from the secondary aircraft to the primary aircraft based on the known or previously calculated values of x, c and angle B; and calculating the bearing angle from the secondary aircraft to the primary aircraft based on the known angle B, the known bearing angle from the radar to the primary aircraft and the previously calculated distances between the primary aircraft, the secondary aircraft and the radar, whereby to establish the location of said secondary aircraft with respect to the primary aircraft.

* * * * *